Sept. 12, 1961
F. R. DEAN
2,999,947
UNIVERSAL LOGICAL PACKAGE
Filed Dec. 5, 1957
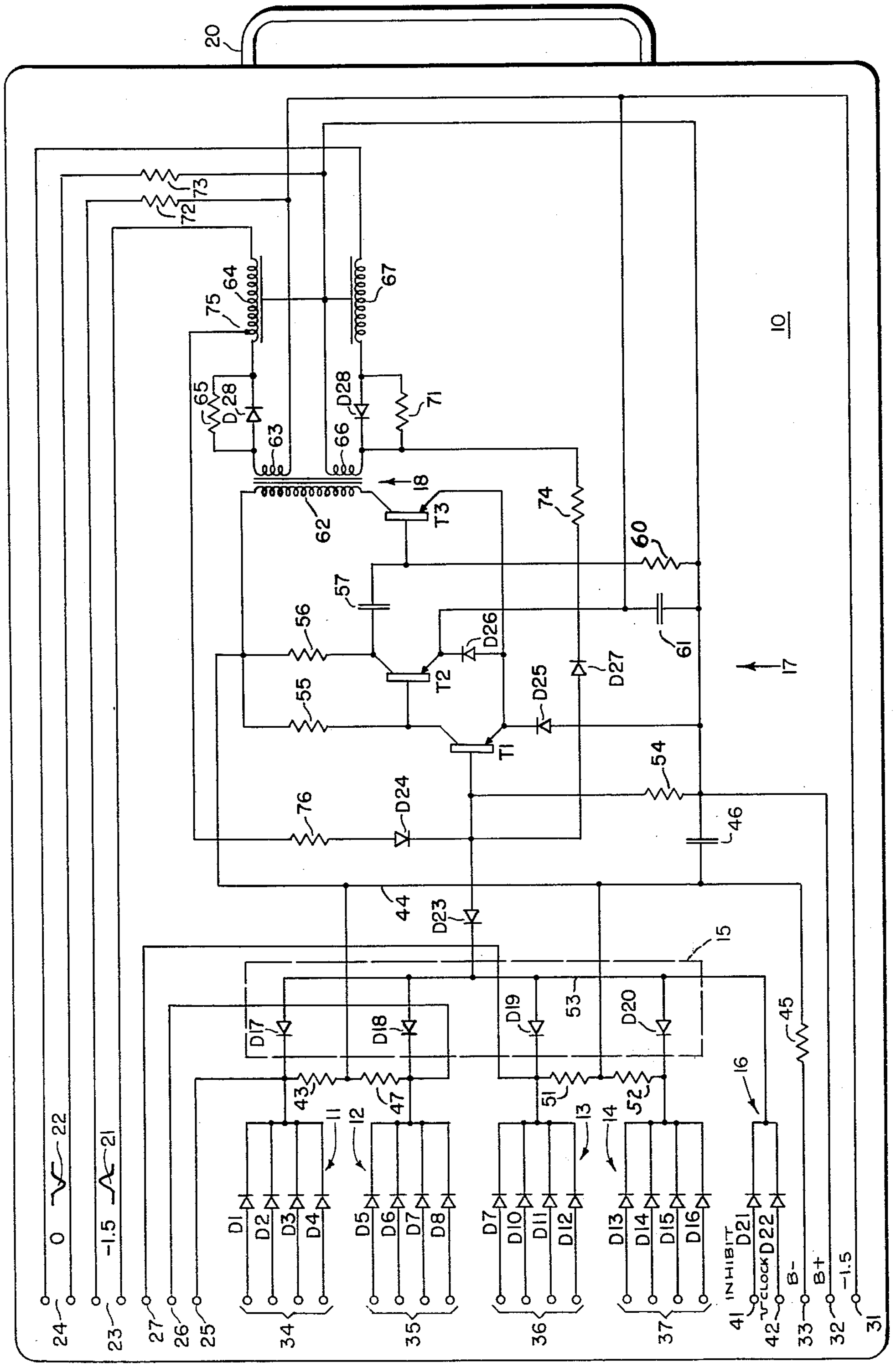

United States Patent Office 2,999,947

Patented Sept. 12, 1961

2,999,947

UNIVERSAL LOGICAL PACKAGE

Franklin R. Dean, Needham, Mass., assignor to Computer Control Company, Inc., Wellesley, Mass., a corporation of Massachusetts Filed Dec. 5, 1957, Ser. No. 700,779
5 Claims. (Cl. 307—88.5)

The present invention relates in general to universal logical packages and more particularly concerns a novel, logical package adapted for interconnection with a plurality of like packages and such well-standardized electronic assemblies, as power supplies, clock pulse sources and binary data storage apparatus whereby an innumerable variety of computer structures may be developed to satisfy the computation and control needs of diverse arts. Each package operates reliably at relatively high speeds, requires little power, and is compactly arranged on a printed circuit board. This application is a continuation in part of the copending application of Franklin R. Dean and Robert W. Brooks entitled, Universal Gating Package, Serial No. 531,068, filed August 29, 1955, now Patent No. 2,820,897.

It had been the practice in the early stages of computer development, to design and then physically build a computer as a unitary structure in which the components for the many identical, repetitive circuits were laid out and wired conventional large equipment chassis. It soon became apparent that computer systems so fabricated were completely inflexible and required an excessive amount of engineering and production time. There soon appeared the design concept of "pre-packaging" or "modulization" wherein one or more basic computer circuits were assembled upon a plug-in fixture whereby a large scale computer could be created simply by appropriately interconnecting the necessary number of plug-in elements and thereafter adding the necessary power supplies, etc. as indicated above.

In using pre-packaged components to develop a computer system, certain advantages and disadvantages naturally follow.

One advantage is that considerable economy is effected through the utilization of mass production techniques. On the other hand, it is not infrequent that through the use of standardized packages, certain component wastage naturally results; for example, when the requisite number of packages have been assembled to implement a specific computer function, there may well be unused diodes, tubes, delay lines and the like. Additionally, when the result of a certain logical operation dictates that an entire package should be disabled from transmitting an output indication, the interconnection among the various inputs and outputs may become quite complicated and require a large amount of time to make the required interconnections. Moreover, a universal logical package with appreciable quantities of unused components occupies space considerably in excess of that ordinarily required for the limited computer function it performs. In a complex computer having a large number of like logical packages, the disadvantageous waste of space and high consumption of power tends to outweigh the advantages otherwise obtained by employing these packages.

The present invention contemplates and has as a primary object the provision of a single reliable logical package which fulfills substantially all needs in most computer systems while effecting maximum economy through the minimization of component wastage, physical space occupied by the package, and power consumed thereby.

Another object of the invention is to provide simplified means for inhibiting the entire logical package by controlling the potential on a single input terminal.

Another object of the invention is the provision of a transistorized logical package capable of handling any combination of three variables.

Still a further object of the invention is the provision of a logical package which may be adapted to serve as a flip-flop, half-adder, shift register stage, or comparator by appropriately interconnecting readily accessible terminals on the package.

Still another object of the invention is to provide a transistorized logical package having a combination of circuits and components especially suited for manufacture by printed circuit board production techniques, the boards being arranged so that input and output terminals may be tied to connectors which readily mate with convenient receptacles to facilitate assembly and disassembly of relatively large numbers thereof.

According to the invention, a plurality of input terminals, output terminals, interconnection terminals and power terminals are arranged along the edge of a printed circuit board which accommodates the circuits making up the logical package. There are a plurality of multilegged input AND gates with each leg connected to a respective input terminal. The outputs of at least some of the input gates are connected to respective interconnection terminals on the edge of the printed circuit board whereby two or more input AND gates may be combined to form a single AND gate with all the input legs of the individual gates thus combined available for use. All of the input gate outputs are buffered together in an OR gate whose output is effectively an input leg to a control AND gate. The other two legs of the control gate are connected to respective input terminals for energization by an inhibit potential and clock pulses respectively. The control AND gate is arranged to provide an output pulse only when there is an output pulse from the OR gate, a clock pulse, and the inhibit potential is not present. With this arrangement, the entire logical package may be easily disabled by applying an inhibit potential to the control AND gate.

The output of the control AND gate is applied to the input of the transistorized amplifier. In this amplifier a pair of cascaded direct-coupled surface barrier transistors are A.-C. coupled to a third drift transistor which energizes the primary of a pulse transformer having a pair of similar secondary windings. Each secondary winding is coupled to a respective output terminal through a delay line. A negative pulse is derived across one of the secondary windings and means are provided for feeding back a portion of this pulse to the input of the amplifier to accelerate conduction therein. A positive pulse is derived across the other secondary winding. This pulse is delayed and fed back to the input of the amplifier to terminate conduction thereof. The positive pulse is biased negatively while the negative pulse is biased positively in order to facilitate cooperation with other like logical packages. Thus, in the absence of a pulse, the negative and zero biasing potentials applied to respective legs of input gates are respectively enabling and disabling potentials. In the presence of a pulse, the condition of the respective input legs is reversed.

Other features, objects and advantages of the invention will become apparent from the following specification when read in connection with the accompanying drawing which illustrates a schematic circuit diagram of a preferred embodiment of the invention represented as arranged upon a printed circuit board.

Referring to the drawing, the schematic circuit diagram is shown upon a printed circuit board 10 having a handle 20 to facilitate handling when relocating the package. Suitable plugs (not shown) may be connected to the respective terminals to adapt the package for plug-in association with an assembly accommodating a number of like packages. There are four input AND gates, 11, 12, 13 and 14, an OR gate 15 and a control AND gate 16. The output of the latter is applied to the input of transistor amplifier 17 having an output transformer 18 for coupling delayed positive and negative output pulses 21 and 22, respectively, biased at —1.5 and 0 volts across output terminal pairs 23 and 24, respectively. Interconnecting terminals 25—27 are connected to the outputs of AND gates 11—13, respectively.

An appropriate D.-C. potential is applied from an external power source between power terminals 32 and 33. An internally derived biasing potential is applied to terminal 31. This terminal is connected to a corresponding terminal in other associated like logical packages so that the biasing potential is the same in all packages.

Each of the gates 11—14 have four legs connected to an input terminal in the groups designated 34—37, respectively. The inhibit potential is applied to terminal 41 and synchronizing clock pulses are applied to terminal 42. By tying together two or more of the interconnecting terminals 25—27, an eight or twelve leg gate may be formed from gates 11, 12 and 13.

Input gate 11 comprises diodes D1—D4 connected through resistor 43 to a potential of —16 volts on line 44 supplied through decoupling resistor 45 from terminal 33. Line 44 is by-passed to ground by capacitor 46. Input gate 12 is formed of diodes D5—D8 connected through resistor 47 to line 44. Input gate 13 comprises diodes D9—D12 connected to line 44 through resistor 51 and input gate 14 is formed of diodes D13—D16 coupled to line 44 through resistor 52. Diodes D17—D20 form OR gate 15 and the output thereof on line 53 is effectively an input to control AND gate 16. Diodes D21 and D22 are also included in control gate 16. Diode D23 couples the output of control gate 16 to the input of amplifier 17, serving to isolate the gates from pulses fed back to the amplifier input.

The input to the latter amplifier is the base of normally non-conductive transistor T1 biased at ground potential through resistor 54 from terminal 32. The collector of transistor T1 is connected to the base of normally conductive transistor T2 and to the —16 volt potential on line 44 through resistor 55. The collector of transistor T2 is connected thereto through resistor 56 and to the base of normally non-conductive transistor T3 through capacitor 57. The emitters of transistors T1 and T3 are clamped to a potential of —0.75 volt by conducting stabistor diode D25. The emitter of transistor T2 is clamped to a potential —0.75 volt below the emitter of transistors T1 and T3, or at —1.5 volts referenced to ground, by conducting stabistor diode D26, and coupled to ground by capacitor 61. The —1.5 biasing potential thus derived is applied to terminal 31. The base of transistor T3 is biased at ground potential through resistor 60. The collector of transistor T3 is coupled through primary winding 62 of transformer 18 to the negative potential on line 44.

Secondary winding 63 is coupled to delay line 64 through diode D28, poled to pass positive pulses, shunted by resistor 65. Similarly, secondary winding 66 is coupled to delay line 67 through the network formed of diode D29 shunted by resistor 71. Delay lines 64 and 67 are conventional multi-section lumped circuit L-C delay lines with the connected-together capacitor plates represented by lines 68 and 69, respectively, connected to ground. The outputs of delay lines 64 and 67 are coupled to respective terminals in output terminal pairs 23 and 24, respectively, the other terminal of each pair being connected to secondary windings 63 and 66, respectively, through terminating resistors 72 and 73, respectively. One end of secondary winding 66 is connected through resistor 74 and diode D27, poled to pass negative pulses, to the base of transistor T1. A tap 75 on delay line 64 is connected through resistor 76 and diode D24, poled to pass positive pulses, to the base of transistor T1.

Having described the circuit arrangement, its mode of operation will be discussed. However, the wide variety of logical operations capable of being carried out by this logical package is omitted in view of the full treatment thereof in the aforesaid parent application. The deconditioned or Zero state is represented by ground potential on an input terminal associated with a leg of an input AND gate. The output therefrom is also at ground potential until all the input legs are negative. Buffer diodes D17—D20 couple this negative potential from any of the input gates 11—14 if, and only if, the clock pulse input terminal 42 and inhibit terminal 41 is then negative. Under these conditions, such negative potential is passed by diode D23 and coupled to the base of transistor T1 to render the latter transistor conductive, thereby raising the potential on the base of normally-conductive transistor T2 whereby the latter is cut off. The corresponding drop in potential on the collector of transistor T2 is coupled through capacitor 57 to the base of transistor T3 to render the latter conductive, thereby drawing current through the primary winding 62 of transformer 18. This induces voltages across secondary windings 63 and 66. Transistor T3 is accordingly driven from cut-off to saturation. The emitters of both transistors T3 and T1 are returned to the —0.7 volt level provided by stabistor diode D25 to positively maintain both normally non-conductive. Arranging these transistors to be normally non-conductive, renders the amplifier virtually insensitive to noise and helps minimize the quiescent power consumption of each logical package.

As transistor T3 goes into conduction, its collector is driven positive and, by transformer action, regenerative feedback of the negative pulse developed across winding 66 is applied through diode D27 and limiting resistor 74 to the base of transistor T1. Amplification is much greater than unity, and is limited only by saturation. It is to be observed at this time that regenerative action has completely overridden control potential initially supplied at the input through diode D23. The positive pulse output is delayed through delay line 64 by approximately 0.2 pulse-period before being fed back from tap 75 to the base of transistor T1 through diode D24 and limiting resistor 76. This degenerative feedback overrides all regeneration and causes very rapid decay of the output pulse.

As a result of these actions, the amplifier output pulse is standardized in time, amplitude and width by clock pulse retiming, amplifier saturation and delayed degeneration, respectively. The secondary winding 66 is referenced to ground and yields negative assertion pulses. The secondary winding 63 is referenced to —1.5 volts and yields positive negation pulses. Both types of pulses are delayed by 0.8 pulse-period so that the wide output pulses will effectively bracket a synchronizing pulse one pulse-period later. This technique virtually eliminates synchronization problems.

Energy stored in the transformer during pulse amplification must be released between adjacent pulses. This energy release causes a pulse overshoot across the respective secondary windings. However, this does not appear across the output terminal pairs 23 and 24 and is rapidly released because diodes D28 and D29 become open-circuits and disconnect the output loads during the intervals of overshoot, and resistors 65 and 71 are of the proper value to critically damp the transformer and allow almost complete recovery before the next pulse is amplified.

Certain additional features of the specific circuit arrangement are to be noted. The rapid switching characteristics of surface barrier transistors are advantageously employed in the first two stages of amplifier 17 where such transistors can accommodate the low signal levels present in these stages. The higher level pulses at the output of transistor T2 are adequately handled by the rapid switching drift transistor T3. Although the maximum collector-emitter potential which a surface barrier transistor can normally withstand is of the order of six volts, the collectors of all three transistors receive power from the same −16 volt source. Yet, the maximum collector-emitter potential of the surface barrier transistors is never exceeded.

This will be better understood from the following discussion. In the quiescent state, transistor T2 conducts; therefore, its base and emitter potential are substantially the same and at −1.5 volts. Base current flows through resistor 55 until this potential is reached. Since the collector of transistor T1 is connected to the base of transistor T2, the collector potential of the former is only −1.5 volts, well below the maximum it can withstand. The collector potential of transistor T2 is then at a safe value because of the potential drop across resistor 56 as the collector current flows therethrough.

When transistor T1 is switched on, the voltage drop across resistor 55 is now due to transistor T1 collector current and the collector potential thereof remains at a safe value. Although transistor T2 is then switched off, sufficient transistor T3 base current is drawn through resistor 56 and capacitor 57 during the short non-quiescent interval to maintain the collector of transistor T2 at a safe value. Transistor T1 and T2 may be type SB102 and transistor T3, type 2N247, both types being commercially available.

Another feature of the invention resides in the internal derivation of the −1.5 volt biasing potential for internal use and as an enabling potential for application to the inputs of other packages. As a result, a single −16 volt power supply fulfills the D.-C. power requirements of each package. This is accomplished by continuously drawing current through stabistor diodes D25 and D26. In the quiescent state this current is drawn through transistor T2. In the non-quiescent state stabistor diode D25 receives current through transistor T1 while diode D26 accepts current from capacitor 61. Additionally, the stabistor diodes bias the emitters so that erratic switching of the respective transistors between conducting and non-conducting states is avoided. Diodes D25 and D26 may be the commercially available type SG–22 stabistor diodes.

Resistors 72 and 73 may serve as terminating resistors for delay lines 64 and 67, respectively, by connecting a jumper between the terminals of terminal pairs 23 and 24, respectively. However, if it is desired to impart additional delay to the output pulses, the lines may be terminated in the external delay package energized with the output pulse.

A novel compact transistorized universal logical package has been disclosed which consumes relatively small amounts of power. Like logical packages may be arranged to form a complex digital computer capable of carrying out substantially any type of logical operation, regardless of complexity while minimizing component wastage.

It is apparent that those skilled in the art may now make numerous modifications of and departures from the specific embodiment described herein without departing from the inventive concepts. Consequently, the invention is to be construed as limited only by the spirit and scope of the appended claims.

What is claimed is:

1. An electrical circuit comprising, a first and second surface barrier transistors each having at least a base, emitter and collector, the collector of said first transistor connected to the base of said second transistor, a drift transistor having at least a base, emitter and collector, a first capacitor between the collector of said second transistor and the base of said drift transistor, a source of direct potential greater than the maximum allowable collector-emitter potential which said surface barrier transistors can withstand, power and reference terminals with said direct potential applied therebetween, first and second resistors connected between said power terminal and the collectors of said first and second transistors, respectively, a transformer having a primary winding connected between said power terminal and the collector of said drift transistor, first and second substantially continuously conducting stabistor diodes serially connected between the emitter of said second transistor and said reference terminal, means connecting the emitters of said first and drift transistors to a junction intermediate said stabistor diodes, third and fourth resistors collected between said reference terminal and the bases of said first and drift transistors, respectively, and a second capacitor between said reference terminal and the emitter of said second transistor.

2. Apparatus in accordance with claim 1 and further comprising, first and second secondary windings on said transformer, means for deriving first and second oppositely-phased pulses across said first and second windings, respectively, means for coupling said second pulse to the base of said first transistor to accelerate conduction thereof, means for delaying said second pulse, and means for coupling the delayed second pulse to the base of said first transistor to terminate conduction thereof.

3. In a universal logical package, apparatus comprising, first and second surface barrier transistors each having at least a base, emitter and collector, the collector of said first transistor connected to the base of said second transistor, a drift transistor having at least a base, emitter and collector, a first capacitor between the collector of said second transistor and the base of said drift transistor, a source of direct potential greater than the maximum allowable collector-emitter potential which said surface barrier transistors can withstand, power and reference terminals with said direct potential applied therebetween, first and second resistors connected between said power terminal and the collectors of said first and second transistors, respectively, a transformer having a primary winding connected between said power terminal and the collector of said drift transistor, first and second substantially continuously conducting stabistor diodes serially connected between the emitter of said second transistor and said reference terminal, means connecting the emitter of said first transistor and said drift transistor to a junction intermediate said stabistor diodes, third and fourth resistors connected between said reference terminal and the bases of said first and drift transistors, respectively, a second capacitor between said reference terminal and emitter of said second transistor, gating means, and means for coupling the output of said gating means to the base of said first transistor.

4. A logical package having input and output terminals and adapted for interconnection and association with a plurality of identical packages for the implementation of logical operations comprising, a plurality of AND gates, each of said AND gates having a plurality of inputs coupled to said input terminals, an OR gate, means for applying the outputs of said AND gates as inputs to said OR gate, a transformer having a primary winding and a pair of secondary windings, a transistor connected to said primary winding for controlling the passage of current in said primary winding, biasing means connected to said transistor for maintaining said transistor in a steady condition in the absence of a trigger signal, a trigger circuit having its input coupled to the output of said OR gate, means coupling the output trigger signal of said trigger circuit to the input of said transistor, means for transmitting a regenerative signal from one of said secondary windings to the input of said trigger circuit, a signal delay device connected to the other of said secondary windings, and means for transmitting a delayed degenerative signal obtained from said delay device to the input of said trigger circuit to terminate said output trigger signal.

5. A logical package having input and output terminals adapted for interconnection with other logical packages for the implementation of logic operations comprising, a plurality of AND gates, each of said AND gates having a plurality of inputs and each of said inputs being connected to a different one of said input terminals, an OR gate, means coupling the outputs of said AND gate to the input of said OR gate, a trigger circuit responsive to the output of said OR gate for providing a trigger signal, a transistor, biasing means connected to said transistor for maintaining said transistor cut off in the absence of a trigger signal, means coupling the trigger signal output of said trigger circuit to the input of said transistor, a transformer having a primary winding and a pair of secondary windings, said transistor being connected to said primary winding and controlling the flow of current therein, a pair of signal delay devices connected to said output terminals, each of said delay devices being connected to a different one of said secondary windings, means for transmitting a regenerative signal from one of said secondary windings to the input of said trigger circuit, and means for transmitting a delayed degenerative signal obtained from the delay device associated with said other secondary winding to the input of said trigger circuit.

References Cited in the file of this patent

UNITED STATES PATENTS

| | | |
|---|---|---|
| 2,663,830 | Oliver | Dec. 22, 1953 |
| 2,787,707 | Cockburn | Apr. 2, 1957 |
| 2,789,220 | Lubkin | Apr. 16, 1957 |
| 2,808,471 | Poucel et al. | Oct. 1, 1957 |
| 2,820,897 | Dean et al. | Jan. 21, 1958 |
| 2,827,545 | Conner et al. | Mar. 18, 1958 |

OTHER REFERENCES

Convention Record of the IRE, 1954, National Convention, part 4, "Packaged Logical Circuitry for a 4 mc. Computer" by Norman Zimbel, pages 133 to 139.